United States Patent [19]
Hibino et al.

[11] Patent Number: 5,737,652
[45] Date of Patent: Apr. 7, 1998

[54] INFORMATION MAGNETIC RECORDING APPARATUS STOPPING MAGNETIC RECORDING IN CASE OF ABNORMAL TEMPERATURE

[75] Inventors: Hideo Hibino, Kawasaki; Norikazu Yokonuma, Yokohama; Kazuyuki Kazami, Tokyo; Youichi Yamazaki, Kawasaki, all of Japan

[73] Assignee: Nikon Corporation, Tokyo, Japan

[21] Appl. No.: 510,490

[22] Filed: Aug. 2, 1995

[30] Foreign Application Priority Data

Aug. 8, 1994 [JP] Japan .................... 6-185691

[51] Int. Cl.⁶ .................... G03B 17/24; G11B 5/00; G11B 15/48
[52] U.S. Cl. .................... 396/319; 360/1; 360/74.1
[58] Field of Search .................... 354/105, 106; 360/1, 3, 31, 69, 71, 74.1; 396/319

[56] References Cited

U.S. PATENT DOCUMENTS 5,210,620  5/1993  Kim .................... 358/335
5,475,455  12/1995  Hibino et al. .................... 354/106

FOREIGN PATENT DOCUMENTS 62229571  8/1987  Japan .
4293038   10/1992  Japan .

Primary Examiner—Aristotelis M. Psitos
Assistant Examiner—Regina Y. Neal
Attorney, Agent, or Firm—Oliff & Berridge PLC

[57] ABSTRACT

An information magnetic recording apparatus according to the present invention has: a magnetic recording head that magnetically records on a film; a magnetic recording signal conversion device that converts information to a magnetic recording signal; a head driving circuit that drives the magnetic recording head based on the magnetic recording signal that is outputted from the magnetic recording signal conversion device; and a temperature detection circuit that detects a temperature around the head driving circuit and determines whether or not the temperature is abnormal. And the magnetic recording signal conversion device stops outputting the magnetic recording signal if the temperature detection circuit detects that the temperature is abnormal.

7 Claims, 15 Drawing Sheets

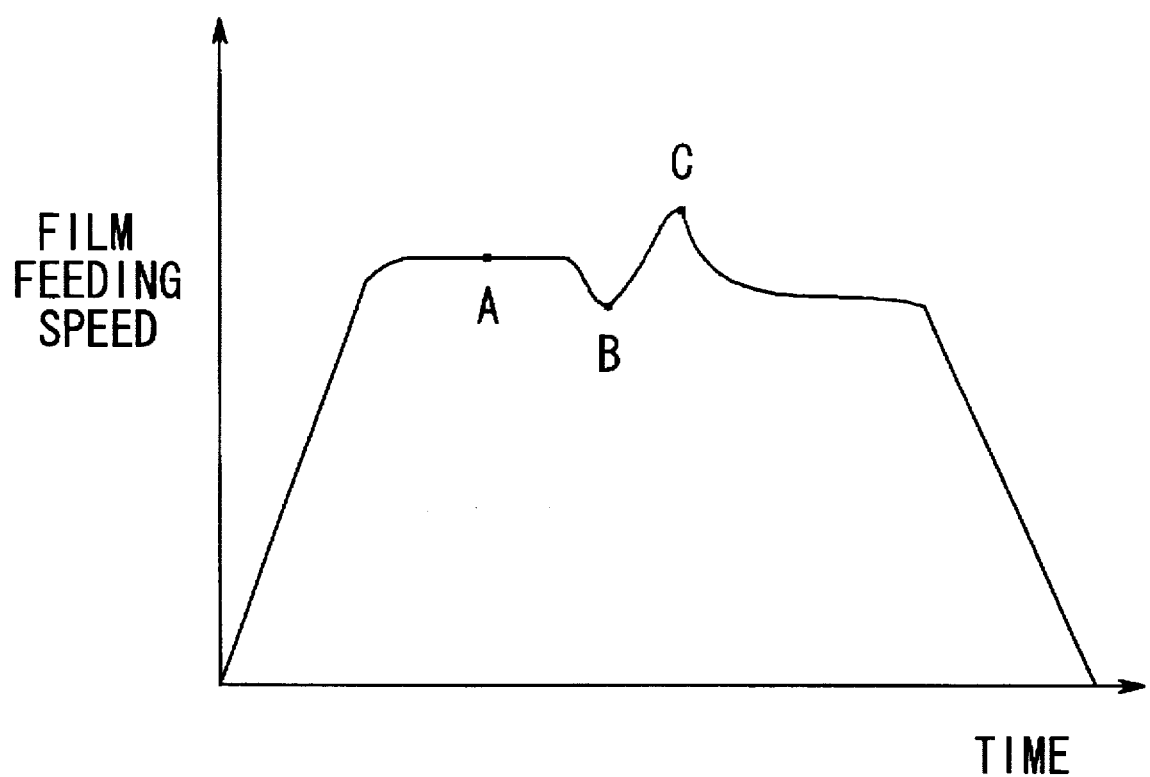

INFORMATION MAGNETIC RECORDING APPARATUS STOPPING MAGNETIC RECORDING IN CASE OF ABNORMAL TEMPERATURE

BACKGROUND OF THE INVENTION

1. Field of the Invention

The present invention relates to an information magnetic recording apparatus that detects an abnormal temperature around a driving circuit of a magnetic recording head, so that magnetic recording on a film is stopped if the abnormal temperature is detected.

2. Description of the Prior Art

The PPM (Pulse Position Modulation) recording method is a per se known method of magnetically recording data upon a magnetic recording medium. FIG. 15 is a waveform diagram illustrating the PPM recording method.

With the PPM recording method, the period of the signal is always kept fixed, and the signal levels "0" and "1" are coded by the position of the trailing edge of the signal waveform. In concrete terms, if the trailing edge of the signal waveform occurs between the start point of the period of the signal and its midpoint this is taken as encoding a "0", while if the trailing edge of the signal waveform occurs between the midpoint of the period of the signal and its end point this is taken as encoding a "1". For example, referring to FIG. 15, when the trailing edge of the signal waveform occurs at a position approximately one quarter period from the head of the signal period this is taken as encoding a "0" (in this case, called a PPM signal of 25% bit location), while when the trailing edge of the signal waveform occurs at a position approximately three quarters period from the head of the signal period this is taken as encoding a "1" (in this case, called a PPM signal of 75% bit location).

The above method enables data to be transmitted correctly even if the trailing edge position in the signal period is somewhat shifted due to a delay over the data line or other cause. In FIG. 15, it is assumed that data of "0" is to be transmitted. It is recognized as data of "0" so long as the signal waveform drops before its half period, even if the data that should drop at one quarter period from the head of the signal period is lagged to actually drop behind the quarter period due to a delay over the data line or other cause. As a result, an error in transmission of data is less likely to occur.

In case of magnetic recording on the magnetic recording medium by the PPM recording method, a direction of electric current is switched according to the PPM signal level, so that a direction of magnetization on the magnetic recording medium is changed. Therefore, since a complicated circuit is required to convert the PPM signal to an electric current signal to drive the magnetic recording head, a magnetic recording head driver IC is normally used.

On the other hand, an IC that has a thermal shutdown function is conventionally known. This kind of IC has a temperature detection element inside thereof, and restricts an output current automatically to prevent an abnormal operation and a destruction of the IC itself due to heating if the internal temperature of the IC becomes higher than a predefined temperature. This kind of IC is used in a various kinds of electric equipment, but it has not been used in a magnetic recording apparatus for an audio-visual equipment conventionally. Because, an audio cassette tape or a videotape is densely coated with magnetic material, therefore it is not needed to supply a big electric current to the magnetic recording head, consequently the magnetic recording head driver IC is not heated so much.

However, since a purpose of a photographic film is essentially photography, only a small amount of magnetic material is coated on the film in order not to have an effect on printing and a negative. As a result, it is required to supply a large electric current to the magnetic recording head to magnetically record on the film, and there is a great possibility of heating of the magnetic recording head driver IC. In this case, a magnetic recording head driver IC that has a thermal shutdown function can be used. However, this kind of IC only stops supplying an electric current to the magnetic recording head when an abnormal temperature is detected, but inputting of the PPM signal into the magnetic recording head driver IC can not be stopped. As a result, since a CPU or the like keeps on supplying the PPM signal to the magnetic recording head driver IC even if the abnormal temperature is detected on the magnetic recording head driver IC, lack of magnetically recording data may occur.

Meanwhile, it can be considered as other methods to reduce heating of the magnetic recording head driver IC that an information magnetic recording apparatus is equipped with a cooling fan, or components are arranged in consideration of cooling characteristics. However, the information magnetic recording apparatus is often installed in a camera, and in this case, since a location of each of components is strictly restricted, the cooling characteristics are not efficient.

SUMMARY OF THE INVENTION

The object of the present invention is to provide an information magnetic recording apparatus that stops outputting a magnetic recording signal in case of an abnormal temperature, and can magnetically record all information on a film even if the abnormal temperature occurs.

In order to attain this object, an information magnetic recording apparatus according to the present invention, comprises: a magnetic recording head that magnetically records on a film; a magnetic recording signal conversion means for converting information to a magnetic recording signal; a head driving means for driving the magnetic recording head based on the magnetic recording signal that is outputted from the magnetic recording signal conversion means; and an abnormality determination means for detecting a temperature around the head driving means and determining whether or not the temperature is abnormal. And the magnetic recording signal conversion means stops outputting the magnetic recording signal if the abnormality determination means determines that the temperature is abnormal.

BRIEF DESCRIPTION OF THE DRAWINGS

FIG. 5 is a figure showing a change of a film feeding speed while a frame of a film is winded.

DESCRIPTION OF THE PREFERRED EMBODIMENTS

First Embodiment

A first embodiment of an information magnetic recording apparatus according to the present invention will be explained with reference to FIGS. 1 through 8. In this embodiment, a case that the information magnetic recording apparatus is installed in a camera will be explained.

Figure 1:
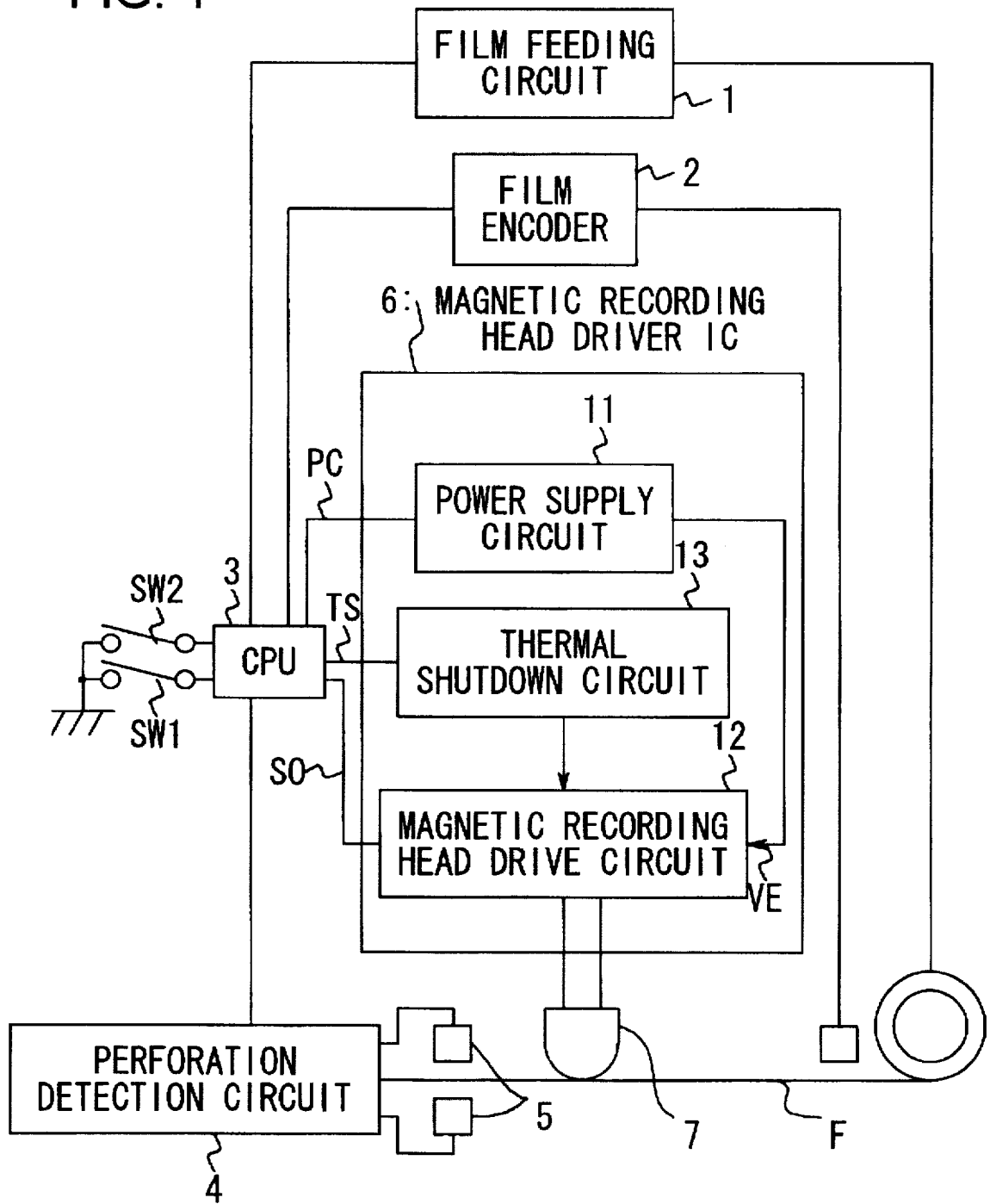
FIG. 1 is a block diagram of a first embodiment of an information magnetic recording apparatus according to the present invention.

FIG. 1 is a block diagram of a whole construction of the first embodiment of the information magnetic recording apparatus according to the present invention. In FIG. 1, the reference numeral 1 denotes a film feeding circuit that winds and rewinds a film F, and the reference numeral 2 denotes a film encoder that detects a feeding speed and a feeding amount of the film F. The reference numeral 3 denotes a CPU that performs operations of FIGS. 6 and 7 that will be explained later and also controls each part of a camera, and a switch SW1 that is turned on by depressing halfway down of a release button and a switch SW2 that is turned on by depressing all-the-way down of the release button are connected to the CPU 3. The reference numeral 4 denotes a perforation detecting circuit that detects perforations on the film, and a signal from a photo-interrupter, components of which are facing each other with the film between, is inputted to the perforation detecting circuit 4. A photo-reflector can be used instead of the photo-interrupter 5.

The reference numeral 6 denotes a magnetic recording head driver IC. The magnetic recording head driver IC 6 has a power supply circuit 11, a magnetic recording head drive circuit 12 and a thermal shutdown circuit 13 inside. The power supply circuit 11 is connected to the CPU 3 via a signal line PC, and supplies or stops an electric power to the magnetic recording head drive circuit 12 based on a command from the CPU 3. The magnetic recording head drive circuit 12 controls an amount and a direction of electric current that flows through a magnetic recording head 7. The thermal shutdown circuit 13 outputs a signal TS by which an abnormal temperature is reported to the CPU 3 when the temperature of the magnetic recording head driver IC 6 has become higher than a predefined temperature, and also outputs a transistor-off signal to the magnetic recording head drive circuit 12.

Figure 2:
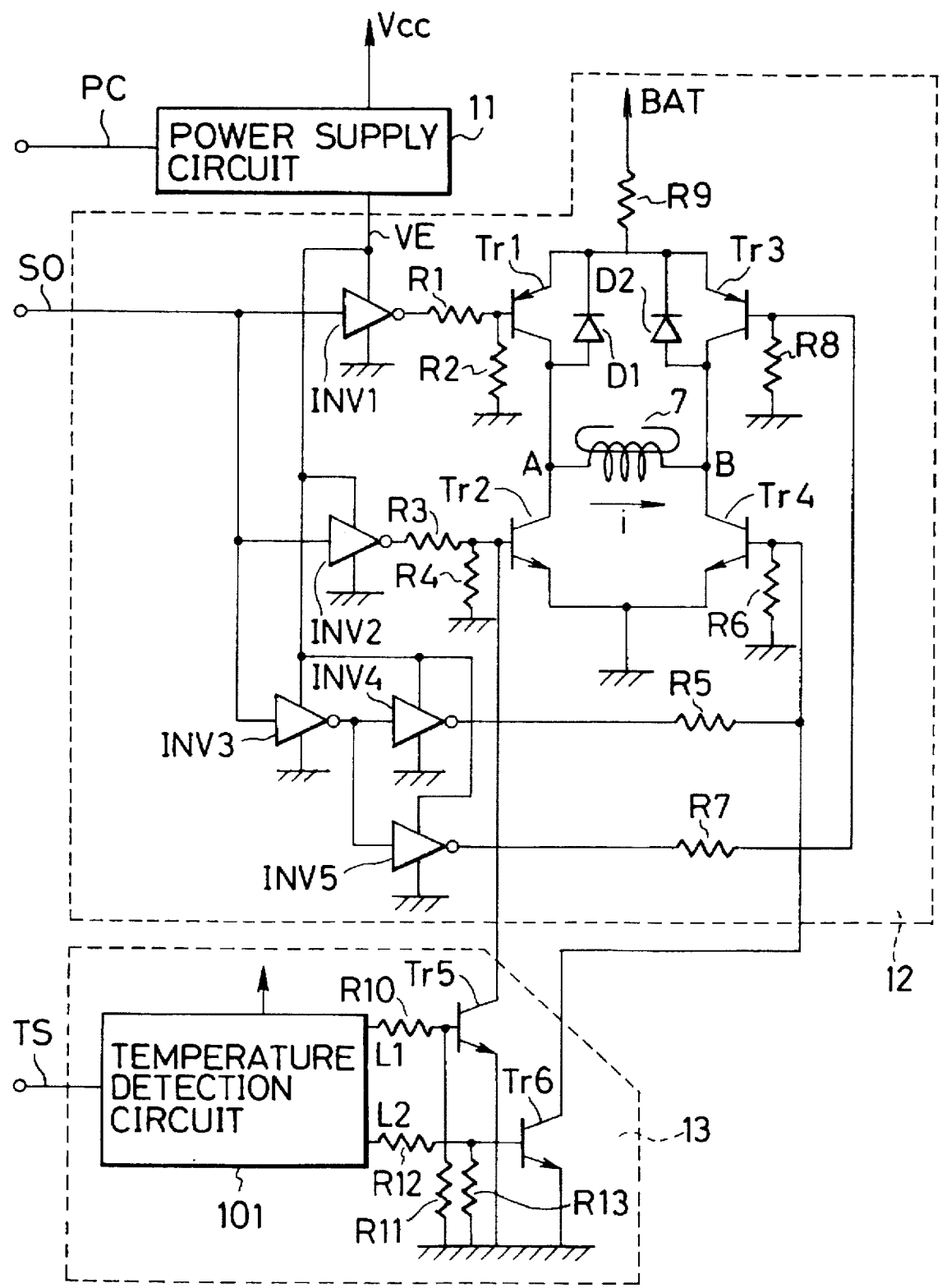
FIG. 2 is an internal circuit diagram of a magnetic recording head driver IC shown in FIG. 1.
Figure 3:
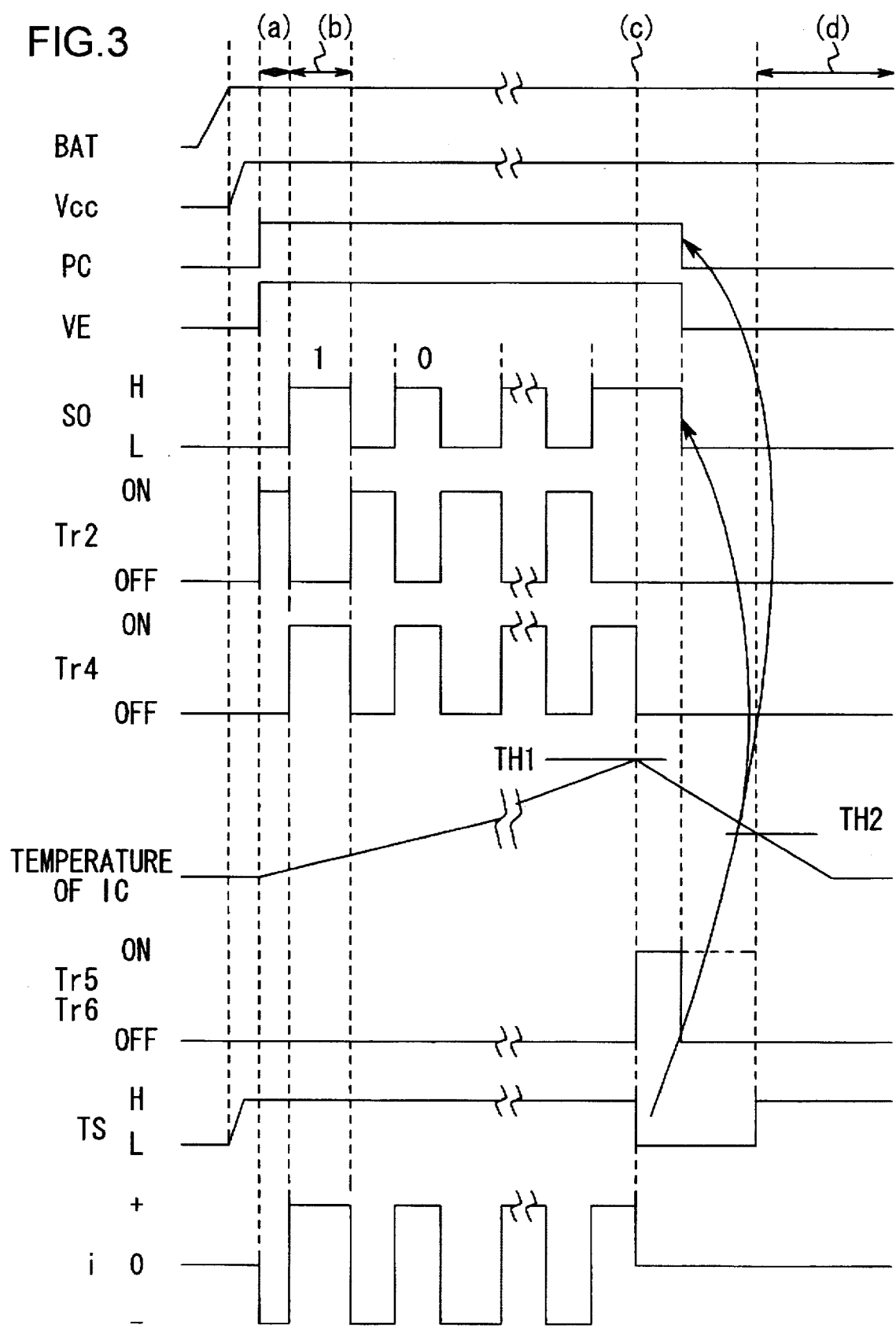
FIG. 3 is a timing chart showing an operation of FIG. 2.

FIG. 2 is an internal circuit diagram of the magnetic recording head driver IC 6, and FIG. 3 is a timing chart showing an operation of FIG. 2. As shown in FIG. 2, the magnetic recording head drive circuit 12 has inverters INV1 through INV5 that invert the PPM signal outputted from the CPU 3, transistors Tr1 through Tr4 that are switched to ON or OFF corresponding to a direction of the electric current to be flowed through the magnetic recording head 7, resistors R1 through R8 that are inserted between the transistors Tr1 through Tr4 and the inverters INV1 through INV5, diodes D1 and D2 that absorb a surge voltage generated on the magnetic recording head 7, and a resistor R9 that adjusts an amount of electric current to be sent to the transistors Tr1 through Tr4.

On the other hand, the thermal shutdown circuit 13 has a temperature detection circuit 101, transistors Tr5 and Tr6, and resistors R10 through R13. The temperature detection circuit 101 determines whether or not the temperature of the magnetic recording head driver IC 6 is higher than the first reference temperature. If the temperature is determined to be higher than the first reference temperature, the signal line TS is set to LOW level and signal lines L1 and L2 are set to HIGH level and then transistors Tr5 and Tr6 are switched to ON. If the temperature has become lower than the second reference temperature after that, the signal line TS is set to HIGH and the signal lines L1 and L2 are set to LOW level and then the transistors Tr5 and Tr6 are switched to OFF.

An operation of the magnetic recording head driver IC 6 will be explained with reference to a timing chart of FIG. 3. The power supply circuit 11 and the CPU 3 are connected to each other with the signal line PC as shown in FIG. 1. When the CPU sets the signal line PC to HIGH level, the power supply circuit 11 supplies an electric power to the inverters INV1 through INV5 in the magnetic recording head drive circuit 12 via a signal line VE. The PPM signal outputted from the CPU 3 is inputted to base terminals of transistors Tr1 through Tr4 via a signal line SO, the inverters INV1 through INV5 and resistors R1, R3, R5 and R7.

If the signal line SO is set to LOW level (a range (a) of FIG. 3), outputs of the inverters INV1 through INV3 become HIGH level and outputs of the inverters INV4 and INV5 become Low level. As a result, the transistors Tr2 and Tr3 are switched to ON and the transistors Tr1 and Tr4 are switched to OFF. Consequently, the electric current from a battery BAT (not shown in Figure) flows through the resistor 9, then the transistor Tr3, then the magnetic recording head 7, and then the transistor Tr2. In other words, the electric current through the magnetic recording head 7 flows from B to A in FIG. 2. On the other hand, if the signal line SO is set to HIGH level (a range (b) of FIG. 3), outputs of the inverters INV1 through INV3 become LOW level and outputs of the inverters INV4 and INV5 become HIGH level. As a result, the transistors Tr2 and Tr3 are switched to OFF and the transistors Tr1 and Tr4 are switched to ON. Consequently, the electric current from the battery BAT flows through the resistor 9, then the transistor Tr1, then the magnetic recording head 7, and then the transistor Tr4. In other words, the electric current through the magnetic recording head 7 flows from A to B in FIG. 2. If a direction of the electric current through the magnetic recording head 7 is changed, a direction of magnetization on the film that is contacted to the magnetic recording head 7 is also changed.

If the temperature of the magnetic recording head driver IC 6 has become higher than the first reference temperature while the electric current is flowing through the magnetic recording head 7 from A to B (a point (c) of FIG. 3), the temperature detection circuit 101 sets the signal line TS to LOW level and the signal lines L1 and L2 to HIGH level. As a result, the CPU 3 detects the LOW level of the signal line TS and then sets the signal line PC to LOW level and stops outputting the PPM signal to the signal line SO. And also, the transistors Tr5 and Tr6 are switched to ON, and the base terminals of transistors Tr2 and Tr4 that are connected to the collector terminals of the transistors Tr5 and Tr6 become LOW level. As a result, the transistors Tr2 and Tr4 switched to OFF. Consequently, the electric current does not flow through the magnetic recording head 7 and the magnetic recording on the film is stopped.

In this manner, if the temperature of the magnetic recording head driver IC 6 has become higher than the first reference temperature, the thermal shutdown circuit 13 of FIG. 2 forces the transistors Tr2 and Tr4 of the magnetic recording head drive circuit 12 to be switched to OFF and then the electric current through the magnetic recording head is stopped.

After that, the temperature is becoming low gradually, and then if the temperature has become lower than the second reference temperature (a range (d) of FIG. 2), the temperature detection circuit 101 sets the signal line TS to HIGH level and the signal lines L1 and L2 to LOW level. When the signal line TS has become HIGH level, the CPU recognizes that the temperature went down and starts outputting the PPM signal via the signal line SO. When the signal lines L1 and L2 become LOW level, the transistors Tr5 and Tr6 are switched to OFF and then the transistors Tr2 and Tr4 are switched to ON or OFF according to the output levels of the inverters INV2 and INV4 that are connected to the base terminals of the transistors Tr2 and Tr4.

Figure 4A:
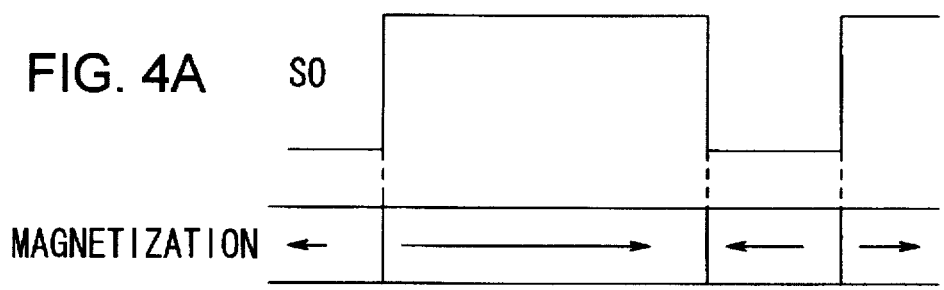
FIGS. 4A, 4B, 4C and 4D are figures showing how a magnetization on a film changes according to a film feeding speed.
Figure 4B:
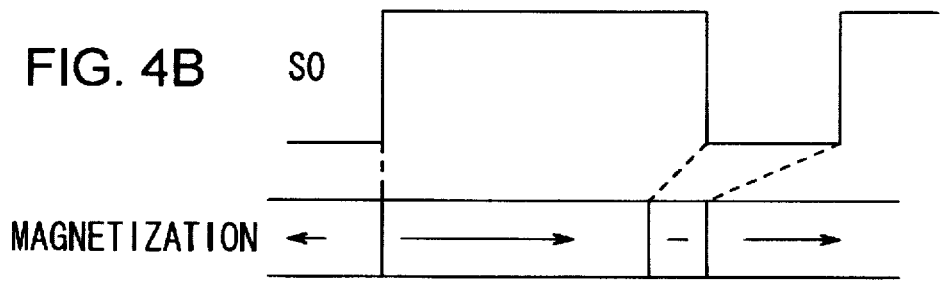
Figure 4C:
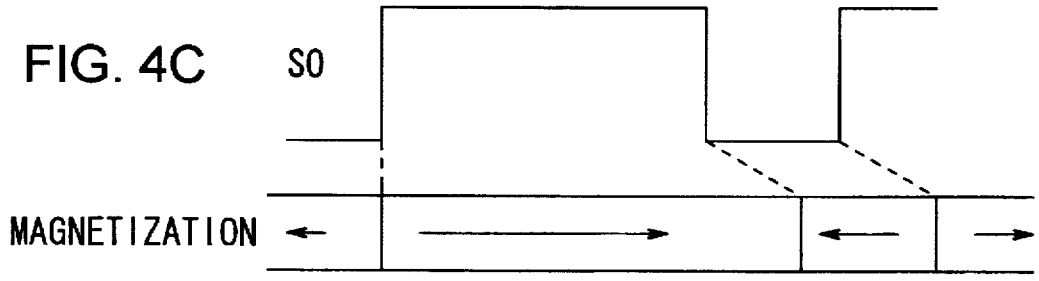
Figure 4D:
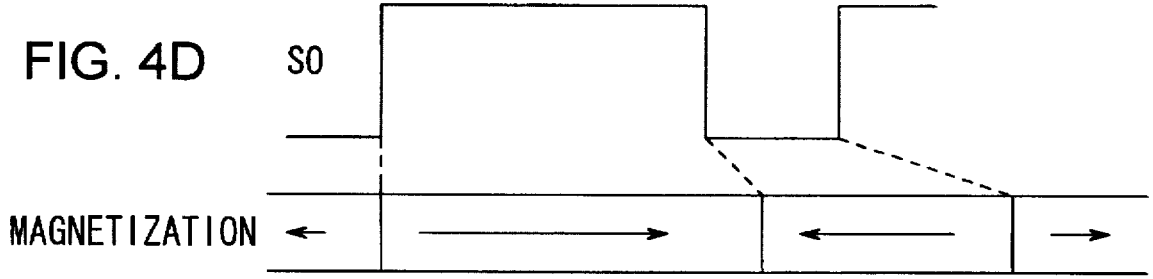

FIGS. 4A through 4B are figures explaining a generation of the PPM signal by the CPU 3.

In this embodiment, since the magnetic recording is performed utilizing a movement of the film F during winding the film, it is required that the magnetic recording for a frame of the film F must be done during winding the frame. Therefore, if an amount of data to be recorded is big, the density of data must be high, that is, the period of the PPM signal must be short.

Meanwhile, in the PPM recording method as mentioned above, the signal levels "0" and "1" are coded by the position of the trailing edge of the signal waveform. For example, if the signal level "1" is outputted, the trailing edge of the signal waveform should occur between the midpoint of the period of the signal and its end point, and if the signal level "0" is outputted, the trailing edge of the signal waveform should occurs between the start point of the period of the signal and its midpoint.

And also the film feeding speed is not always stable and varies according to time as shown in FIG. 5. For example, in case that the signal level "1" is recorded with the PPM recording method when the film feeding speed is at the point A of FIG. 5, the magnetization on the film is shown in FIG. 4A. In FIG. 4A, a right arrow shows a magnetization of HIGH level and a left arrow shows a magnetization of LOW level. In case of the film feeding speed at the point B that is slower than one at the point A, the magnetization on the film is shown in FIG. 4B, and the length of magnetization are is shortened. In other words, the slower the film feeding speed is, the higher the density of recording on the film F is.

However, in case that an amount of data to be magnetically recorded on the film F is big, it is originally required that the density of recording on the film F is high. At this time, if the film feeding speed becomes slow as shown at the point B of FIG. 5, the density of recording on the film F becomes still higher. As a result, when the signal level "1" is recorded, a length of LOW level area is extremely shortened. And there is a possibility that a magnetization does not change from a right arrow to a left arrow. Therefore, in case that the period of the PPM signal is short, that is, an amount of data to be magnetically recorded is big, it is desirable that the trailing edge of the signal waveform occurs closer to the midpoint of the period.

On the other hand, if the film feeding speed becomes fast as shown at the point C of FIG. 5, the length of magnetization area is lengthened. In case that the period of the PPM signal is long, that is, an amount of data to be magnetically recorded on the film F is small, the length of magnetization area is also lengthened. However, if the film feeding speed becomes faster when the period of the PPM signal is long, the length of LOW level area becomes longer in FIG. 4D than in FIG. 4C. As a result, if the trailing edge of the signal waveform occurs closer to the midpoint of the period, a difference between the length of magnetization showing HIGH level and the length of magnetization showing LOW level becomes small, and there is a possibility that it can not be clearly distinguished between the signal level "1" is recorded and the signal level "0" is recorded. Therefore, in case that the period of the PPM signal is long, that is, an amount of data to be recorded is small, it is desirable that the trailing edge of the signal waveform should occurs more away from the midpoint of the period.

Consequently, in this embodiment, the position of the trailing edge is determined according to an amount of data to be magnetically recorded as follows.

(1) In case of a big amount of data: 33% for "0", 66% for "1"

(2) In case of a small amount of data: 25% for "0", 75% for "1"

Figure 6:
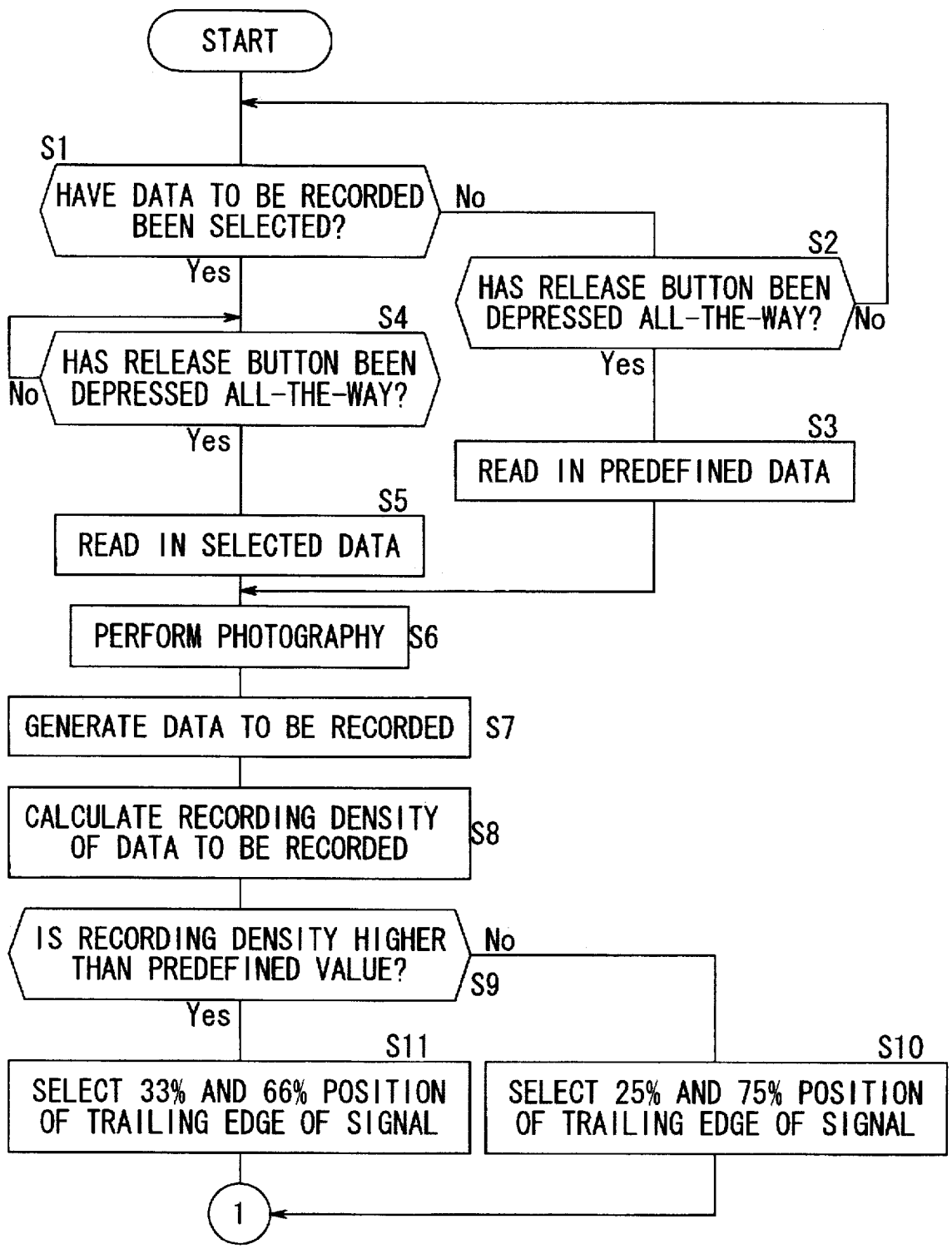
FIG. 6 is a flowchart showing an operation of a CPU in a first embodiment.
Figure 7:
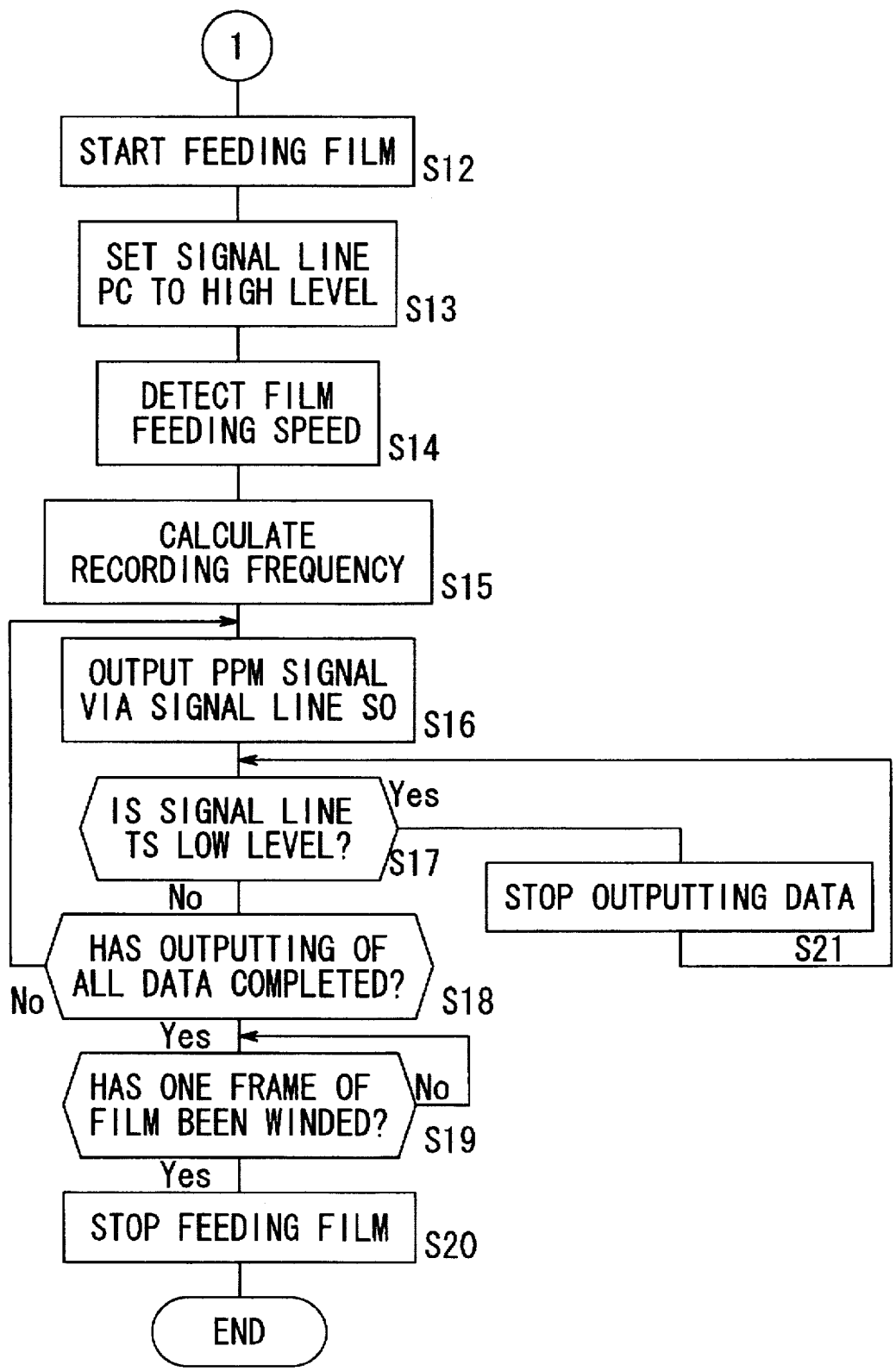
FIG. 7 is a flowchart following FIG. 6.

FIGS. 6 and 7 are flowcharts showing an operation of the CPU 3, and the CPU 3 starts these flowcharts when the release button is depressed halfway down.

In the step S1 of FIG. 6, a decision is made as to whether or not data to be magnetically recorded have been selected by a selection switch which is not shown in the figure. A kind of data to be magnetically recorded on the film is a date of photography, a shutter speed, an aperture value, a color temperature, characters that a photographer designates or the like. In this embodiment, only data that are selected by the selection switch are magnetically recorded.

If the decision is NO in the step S1, the flow of control goes to the step S2 and a decision is made as to whether or not the release button has been depressed all-the-way down. If the decision is NO in the step S2, the flow of control returns to the step S1, and if the decision is YES in the step S2, the flow of control goes to the step S3. In the step S3, predefined data are read in. The step 3 is performed in case that the photographer did not select data to be magnetically recorded with the selection switch. In this case, default data are magnetically recorded.

If the decision is YES in the step S1, the flow of control goes to the step S4, and a decision is made as to whether or not the release button has been depressed all-the-way. If the decision is NO in the step S4, the flow of control stays in the step S4. If the decision is YES in the step S4, the flow of control goes to the step S5. In the step S5 selected data are read in and then the flow of control goes to the step S6.

In the step S6, a photography operation is performed such as a shutter control. In the step S7, recording data are generated based on the data that were read in the step S3 or S4. In the step S8, a recording density of the recording data is calculated based on an amount of the recording data. In the step S9, a decision is made as to whether or not the recording density is higher than a predefined value. The decision is NO in the step S9, the flow of control goes to the step S10, and then the recording data are converted to a PPM signal in which positions of the trailing edge of the waveform are at 25% and at 75%. On the other hand, the decision is YES in the step S9, the flow of control goes to the step S11, and then the recording data are converted to a PPM signal in which positions of the trailing edge of the waveform are at 33% and 66%.

The flow of control goes to the step S12 after the operation in the step S10 or S11 is completed, and a signal is sent to the film feeding circuit 1 and feeding of the film F is started. In the step S13, the signal line PC is set to HIGH level. As a result, the power supply circuit 11 supplies an electric power to inverters INV1 through INV5 in the magnetic recording head driver IC 6 shown in FIG. 2.

In the step S14, the film encoder 2 detects a film feeding speed. In the step S15, a recording frequency of the recording data is calculated based on the film feeding speed. In the step S16, the PPM signal that was generated in the step S10 or S11 is outputted to the magnetic recording head driver IC 6 with the recording frequency calculated in the step S15. This outputting is performed via the signal line SO.

In the step S17, a decision is made as to whether or not the signal line TS is LOW level, that is, the abnormal temperature is detected. If the decision is NO in the step S17, the flow of control goes to the step S18, and then a decision is made as to whether or not outputting of all data has completed. If the decision is NO in the step S18, the flow of control returns to the step S16, and if the decision is YES, the flow of control goes to the step S19.

In the step S19, a decision is made as to whether or not a frame of the film F has been winded. This decision is made by using the perforation detection circuit 4. If the decision is NO in the step S19, the flow of control stays in the step S19, and if the decision is YES in the step S19, the flow of control goes to the step S20. In the step S20, feeding of the film F is stopped and then the operation is terminated.

On the other hand, if the decision is YES in the step S17, the flow of control goes to the step S21, and outputting of the PPM signal from the signal line SO is stopped, and then the flow of control returns to the S17. After that, if the internal temperature of the magnetic recording head driver IC 6 has become lower than the second reference temperature, the signal line TS is set to HIGH level. As a result, the decision becomes NO in the step S17 and the magnetic recording is restarted.

The above-mentioned operations of FIGS. 6 and 7 are summarized as follows. Data to be recorded are read in, then an amount of the data is detected, then the position of the trailing edge of the PPM signal is determined based on the amount of the data. Next, a film feeding speed is detected, then the PPM signal is outputted with a frequency according to the film feeding speed. The CPU 3 is continuously monitoring the signal level of the signal line TS while outputting the PPM signal, and if the signal level has changed to LOW level, the CPU recognizes that an abnormal temperature has occurred in the magnetic recording head driver IC 6, and then stops outputting data. And also, the CPU monitors whether or not the film F has moved to a designated perforation position, if the film has moved to the designated perforation position, feeding of the film is stopped.

Figure 8A:
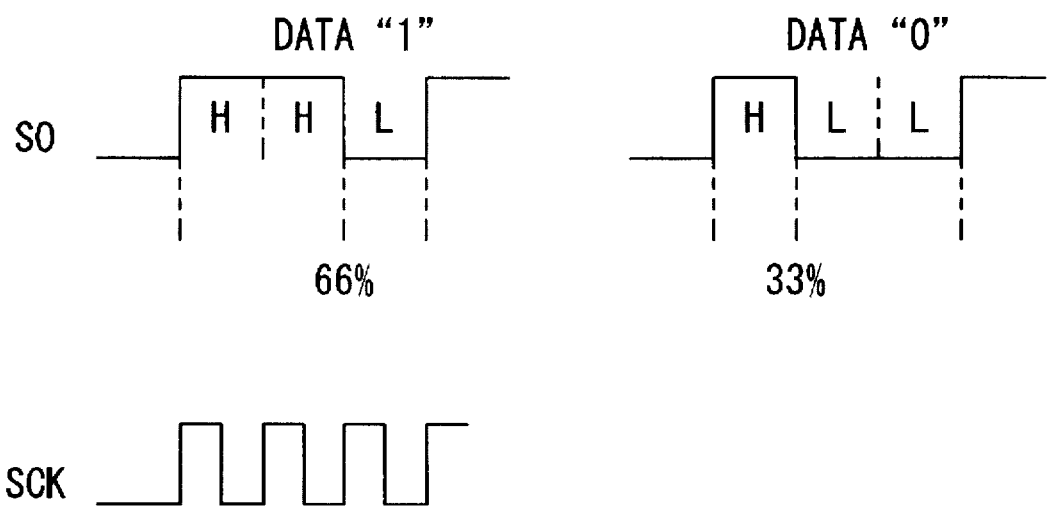
FIGS. 8A and 8B are figures showing a relation between a reference clock SCK and a PPM signal SO.
Figure 8B:
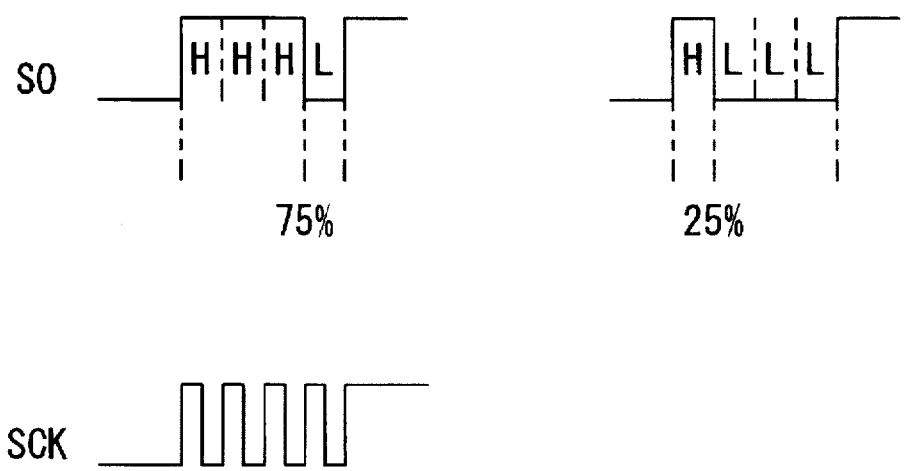

FIGS. 8A and 8B show a relation between a reference clock SCK and the PPM signal SO. In FIG. 8A, three periods of reference clock SCK make a period of the PPM signal, and the position of the trailing edge of the signal waveform for "0" is at 33% and the position of the trailing edge of the signal waveform for "1" is at 66%. On the other hand, in FIG. 8B, four periods of reference clock SCK make a period of the PPM signal, and the position of the trailing edge of the signal waveform for "0" is at 25% and the position of the trailing edge of the signal waveform for "1" is at 75%.

In both FIGS. 8A and 8B, an integer multiple of reference clock SCK make a period of the PPM signal, and also the position of the trailing edge of the signal waveform is at a position of a integer multiple of reference clock SCK. If the reference clock SCK is used in this manner, serial data can be converted to the PPM signal easy and fast.

As explained above, in the first embodiment, if the internal temperature of the magnetic recording head driver IC 6 has become higher than the first reference temperature, the CPU 3 stops the operation of the power supply circuit 11 and also stops outputting the PPM signal, and the thermal shutdown circuit 13 blocks the electric current for recording to flow through the magnetic recording head 7. Consequently, the magnetic recording head driver IC 6 is certainly protected from destruction due to the abnormal temperature, and lack of recording information due to the abnormal temperature is also certainly prevented.

And also, since two controls that are the control from the CPU 3 and the control from the thermal shutdown circuit 13 stop the magnetic recording, even if one control has a trouble, an incorrect magnetic recording is certainly prevented.

Further, since outputting of the PPM signal is restarted if the abnormal temperature is gone, a continuous magnetic recording is possible.

In this first embodiment, if the temperature detection circuit 101 detects the abnormal temperature, the transistors Tr5 and Tr6 are switched to OFF. However, it is acceptable, for example, that an electric power from the battery to the resistor R9 is blocked instead of making the transistors Tr5 and Tr6 switched to OFF. In other words, all means are acceptable that block the electric current to flow through the magnetic recording head in case of the abnormal temperature.

Second Embodiment

A second embodiment is an embodiment that simplifies the internal construction of the magnetic recording head driver IC of the first embodiment. Since parts of the second embodiment except the magnetic recording head driver IC are common to parts of the first embodiment, only the construction and the operation of the magnetic recording head driver IC will be explained.

Figure 9:
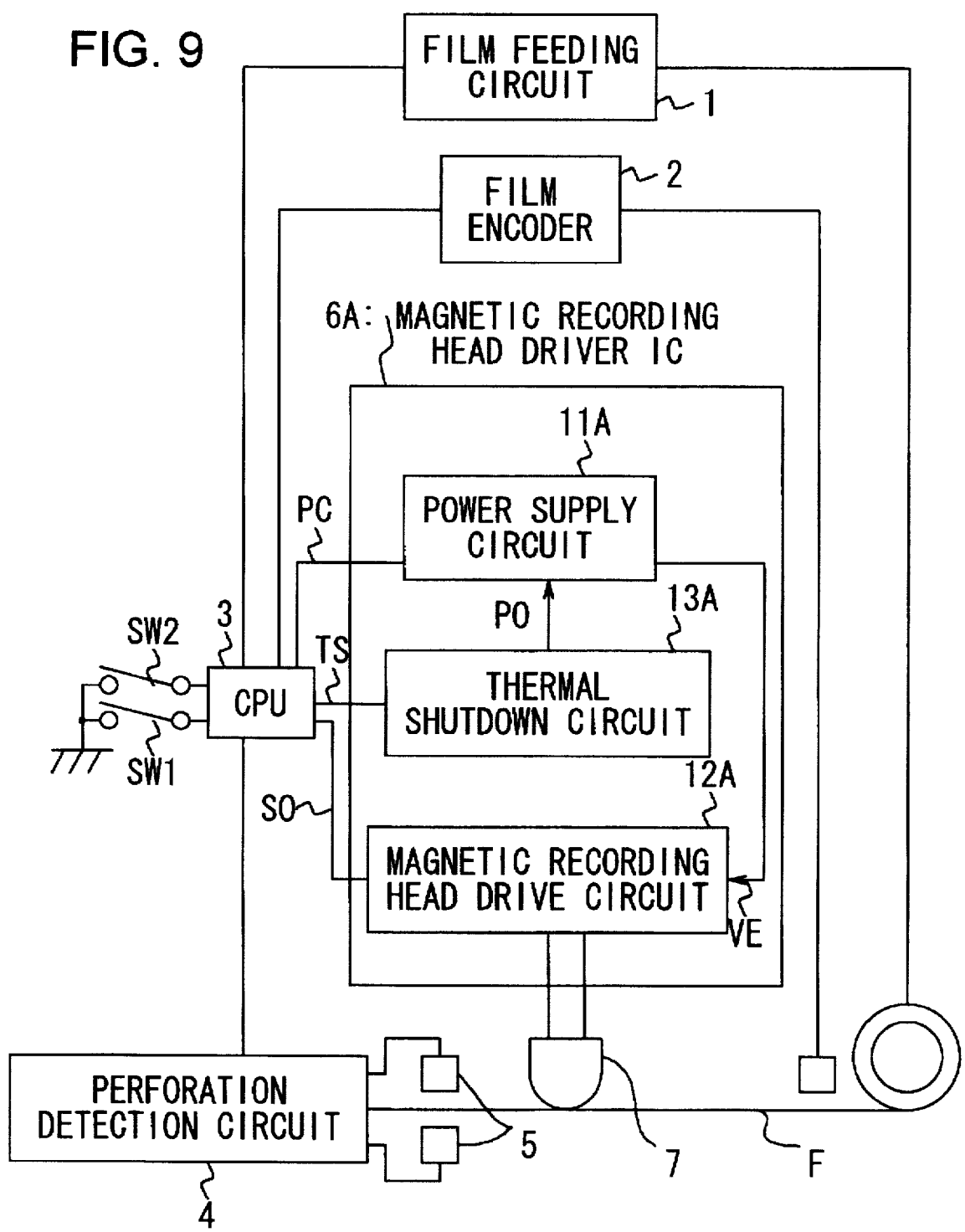
FIG. 9 is a block diagram of a second embodiment of an information magnetic recording apparatus according to the present invention.
Figure 10:
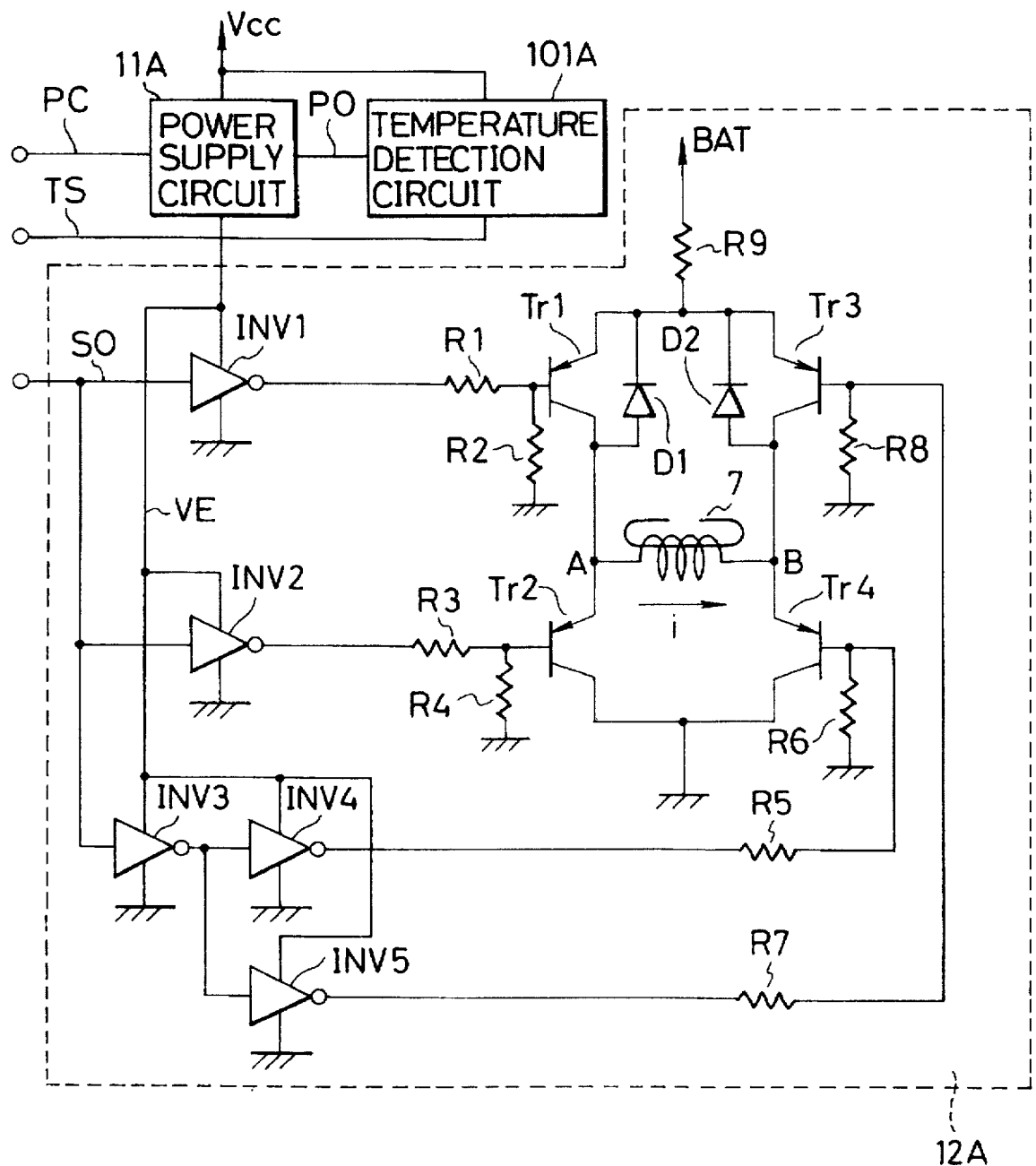
FIG. 10 is an internal circuit diagram of a magnetic recording head driver IC shown in FIG. 9.
Figure 11:
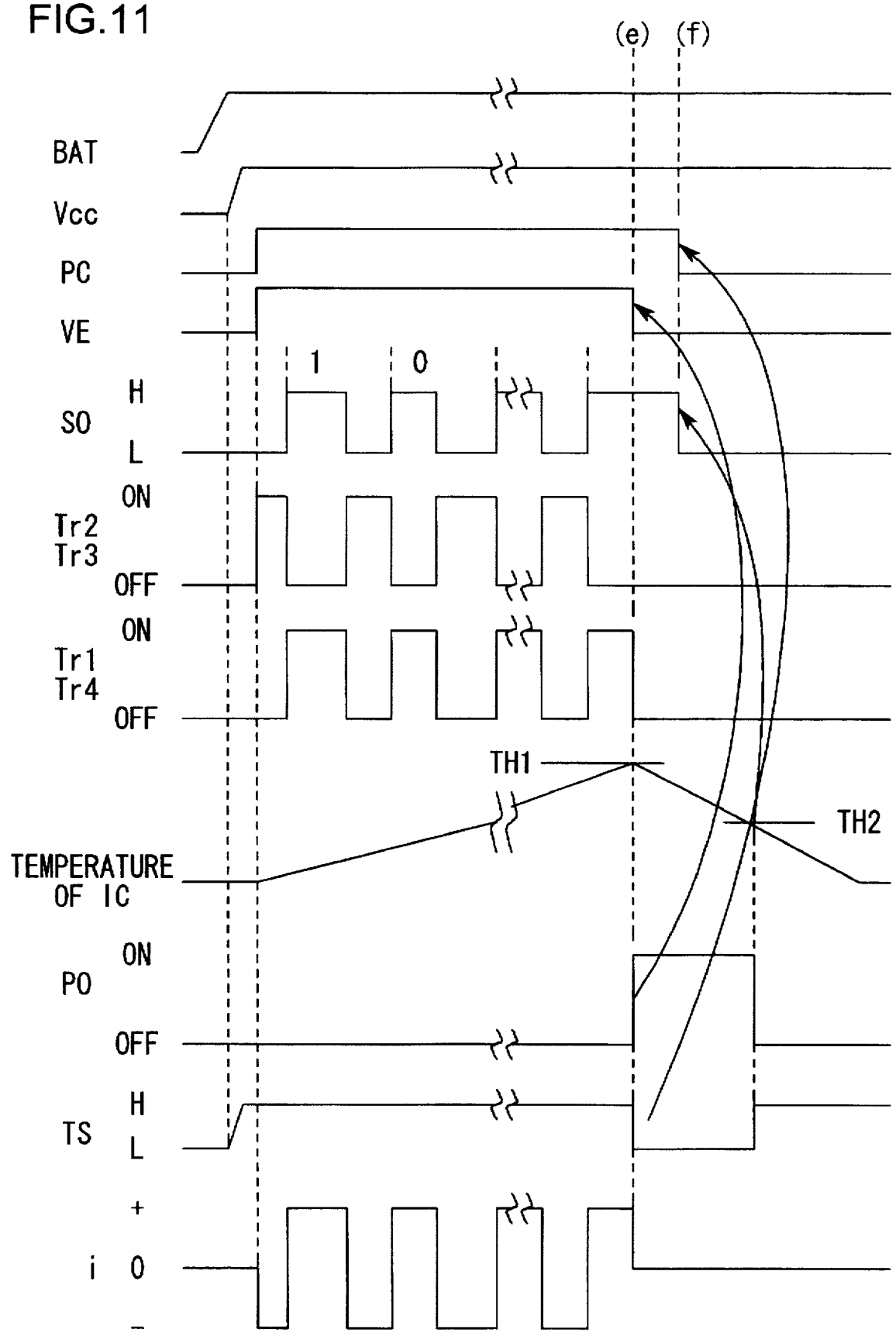
FIG. 11 is a timing chart showing an operation of FIG. 10.

FIG. 9 is a block diagram showing a whole construction of the second embodiment of the information magnetic recording apparatus. FIG. 10 is an internal circuit diagram of the magnetic recording head driver IC 6A of the second embodiment. FIG. 11 is a timing chart showing an operation of FIG. 10. In FIGS. 9 and 10, parts that are common to parts of FIGS. 1 and 2 are denoted by the same reference numerals, and different points will be mainly explained. In FIG. 10, a temperature detection circuit 101A is connected to a power supply circuit 11A via a signal line PO. If the internal temperature of the magnetic recording head driver IC 6A has become higher than the first reference temperature, the temperature detection circuit 101A sets the signal line PO to HIGH level. In FIG. 9, the power supply circuit 11A sets signal line VE to LOW level if the signal line PO has become HIGH level. In other words, if the internal temperature of the magnetic recording head driver IC 6A has become higher than the first reference temperature, the power supply circuit 11A stops supplying an electric power to inverters INV1 through INV5. As mentioned above, since the power supply 11A is connected to the CPU 3 via the signal line PC, the power supply 11A is also forced to stop supplying the electric power according to a command from this path.

An operation of the magnetic recording head driver IC 6A of the second embodiment will be explained with reference to the timing chart of FIG. 11.

If the internal temperature of the magnetic recording head driver IC 6A has become higher than the first reference temperature (a point (e) of FIG. 11), the temperature detection circuit 101A sets the signal line PO to HIGH level and the signal line TS to LOW level. As a result, the power supply circuit 11A sets the signal line VE to LOW level and stops supplying an electric power to the inverters INV1 through INV5. Consequently, both transistors Tr2 and Tr4 are switched to OFF and the electric current to flow through a magnetic recording head 7 is stopped. On the other hand, if the CPU detects that the signal line TS has become HIGH level, the CPU 3 sets the signal line PC to LOW level (a point (f) of FIG. 11). Since this signal line PC is inputted to the power supply circuit 11A, the power supply circuit 11A sets the signal line VE to LOW level even if the signal line VE has not been LOW level.

In this manner, in the second embodiment, since both signal lines PO and PC that indicate whether or not the temperature is abnormal are inputted to the power supply circuit 11A, even if one of them has a breaking of wire or the like, the power supply circuit 11A can detect the abnormal temperature and certainly stop supplying an electric power to the inverters in case of the abnormal temperature. In this embodiment, controlling of base terminals of transistors is not adopted unlike the first embodiment, the circuit can be simplified compared with the first embodiment.

Third Embodiment

A third embodiment is an embodiment wherein, if an abnormal temperature of a magnetic recording head driver IC 6 has occurred, an error is displayed and one frame of a film is rewinded and a control waits until the temperature becomes normal. If the temperature has become normal, a PPM signal that indicates data of one frame is magnetically recorded again from the first. A whole construction diagram and an internal circuit diagram of the magnetic recording head driver IC 6 of the third embodiment are the same as FIGS. 1 and 2 of the first embodiment. Only a part of control of a CPU 3 is different from the first embodiment. Consequently, only the different part will be mainly explained with reference to FIGS. 12 through 15. FIGS. 12 through 15 are flowcharts showing an operation of the CPU 3 of the third embodiment. Steps that are common to steps of the first embodiment are denoted by the same reference numerals and will not be explained.

Figure 12:
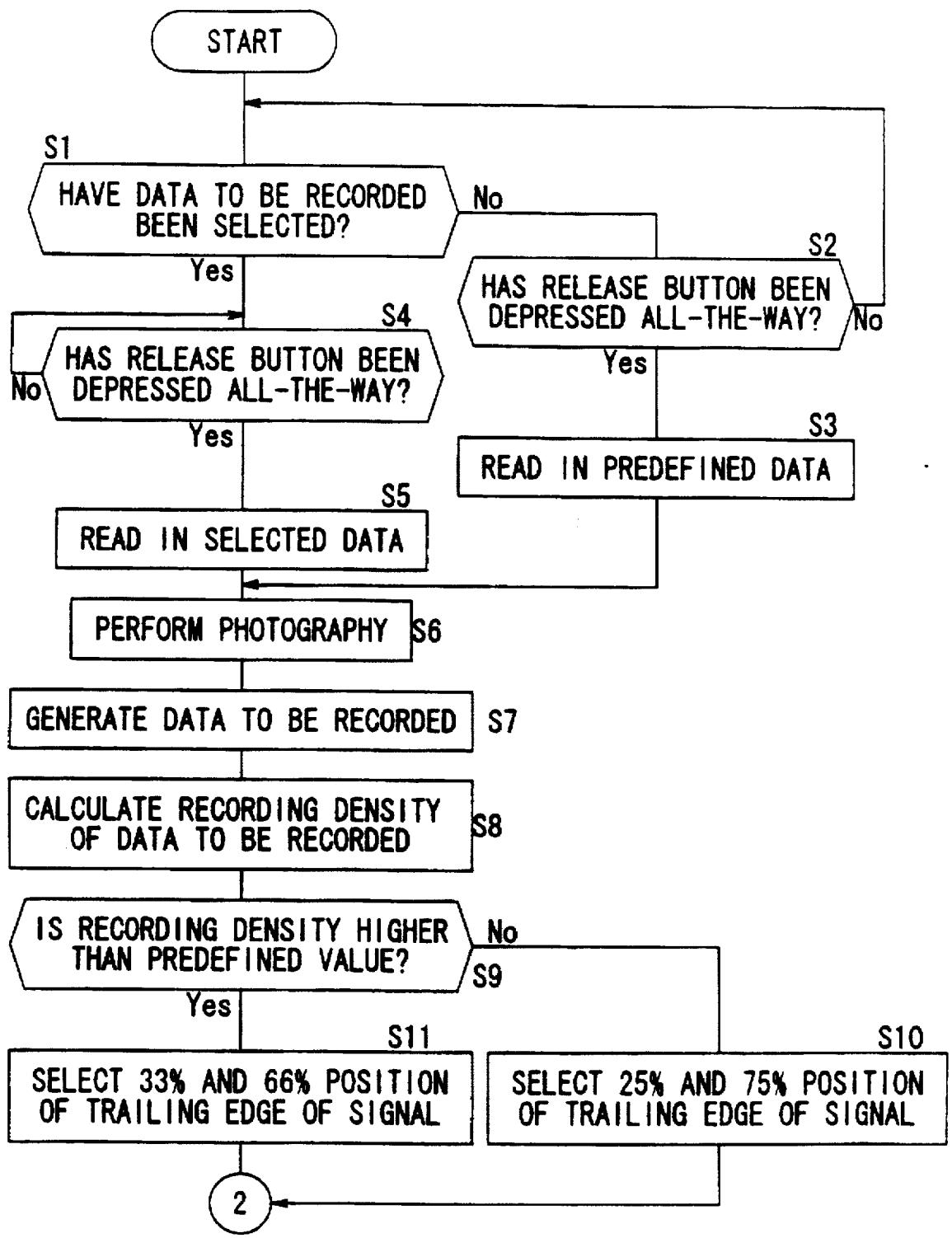
FIG. 12 is a flowchart showing an operation of a CPU in a third embodiment according to the present invention.
Figure 13:
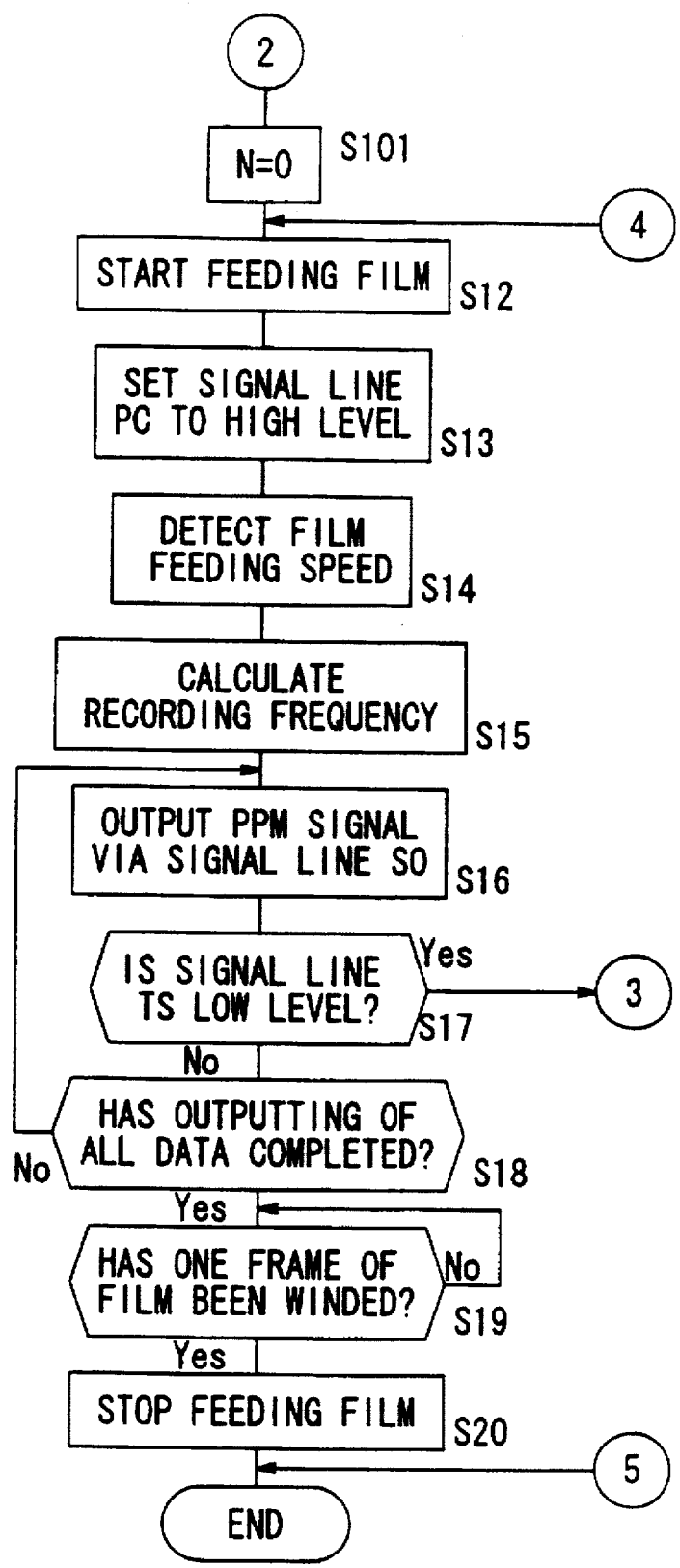
FIG. 13 is a flowchart following FIG. 12.
Figure 14:
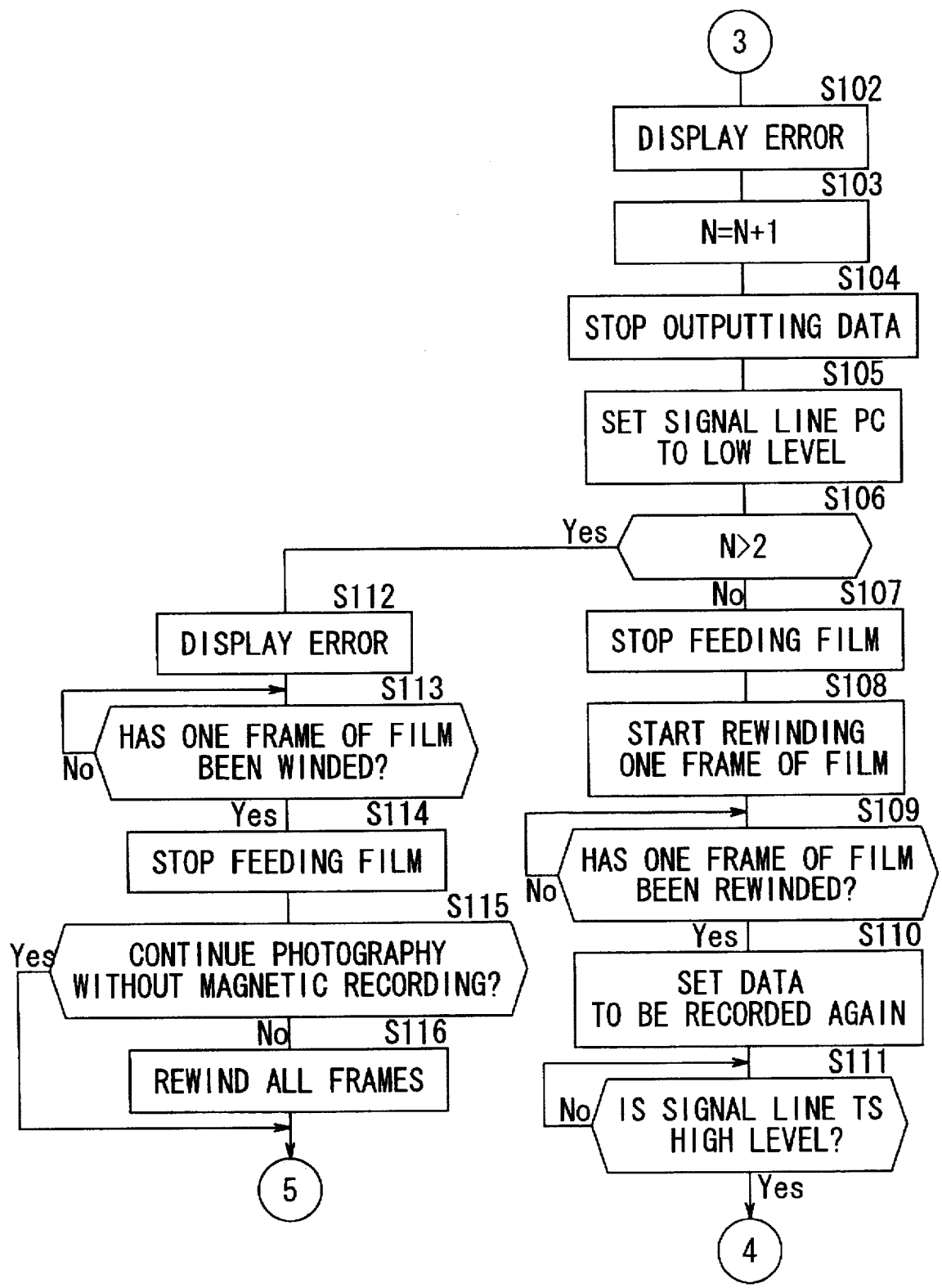
FIG. 14 is a flowchart following FIG. 13.
Figure 15:
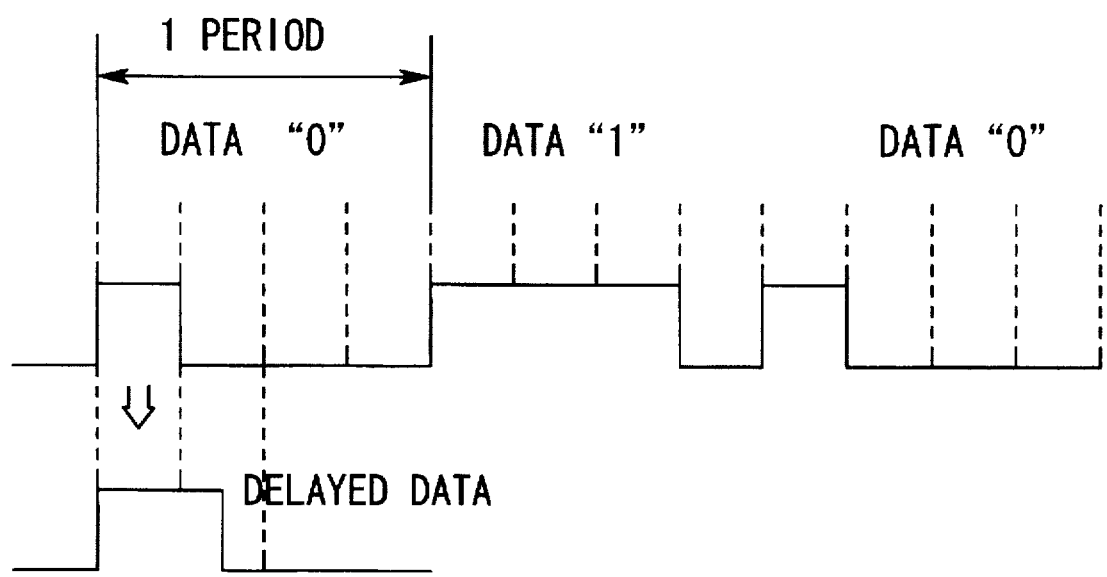
FIG. 15 is a figure explaining a PPM signal.

Steps of FIG. 12 are the same as steps of FIG. 6. In the step S101 of FIG. 13, an error count index N is reset to zero. In the step S17, a decision is made as to whether or not a signal line TS is LOW level, that is, the temperature is abnormal. If the decision is NO in the step S17, the flow of control goes to the step S18, and if the decision is YES in the step S17, that is, the temperature is abnormal, the flow of control goes to the step S102 of FIG. 14.

In the step S102, an error that the abnormal temperature has occurred is displayed on a display device (not shown in Figure) and the error count index N is incremented in the step S103. Next, the flow of control goes to the step S104, and outputting of the PPM signal from a signal line SO is stopped. In the step S105, the signal line PC is set to LOW level. If the signal line PC becomes LOW level, a power supply circuit 11 of the magnetic recording head driver IC 6 shown in FIG. 2 stops supplying an electric power to inverters INV1 through INV5, and then an electric current to flow through a magnetic recording head 7 is stopped.

In the step S106, the decision is made as to whether or not the error count index N is more than 2. In other words, a decision is made as to whether or not the abnormal temperature has been counted three times. If it has been counted three times, the flow of control goes to an error handling operation in and after the step S112, and if it has been counted less than three times, the flow of control goes to an error recovery operation in and after the step S107.

In the step S107, feeding of the film is stopped, and a frame of the film is rewinded in the steps S108 and S109. In the step S110, data are set again in order to magnetically record the PPM signal from the first that was tried to be recorded in the step S16. In the step S111, the flow of control wait until the temperature becomes normal, and if the temperature has become normal, the flow of control returns to the step S12 in order to perform the magnetic recording again.

In case that the abnormal temperature is detected even if the above-mentioned operation has been repeated two times, this case is detected in the step S106, and the flow of control goes to the step S112. In the step S112, an error of this case is displayed on the display device (not shown in Figure). In the step S113, the frame of the film on which the magnetic recording error was occurred is advanced to complete winding of the frame, and feeding of the film is stopped in the step S114. In the step S115, a photographer is required to answer via the display device (not shown in Figure) whether or not a photography should be continued without the magnetic recording from now on. If the photographer answers that the photography should be continued without the magnetic recording, this routine is terminated. After this, the CPU 3 controls with a flag that indicates no magnetic recording so that no magnetic recording is performed. The photographer can answer by operating a designated button (not shown in Figure) whether or not the photography should be continued without the magnetic recording.

If the photographer answers that the photography should not be continued in the step S115, the photography is quitted and all frames of the film are rewinded, and then this routine is terminated.

In this manner, in the third embodiment, if the abnormal temperature has occurred during a magnetic recording, the frame on which the magnetic recording was not completed is rewinded, and then the same data are tried to be recorded again on the same frame after the temperature becomes normal. Therefore, the control can certainly wait until the temperature becomes normal, and lack of recording information due to the abnormal temperature is certainly prevented.

In the third embodiment, the error recovery operation is repeated two times when the abnormal temperature occurs, but the number of times does not need to be limited to two and one time or more than two times is acceptable.

In the above-mentioned first embodiment through third embodiment, the trailing edge is used to determine the signal level in the PPM signal. However the rising edge can be used in the PPM signal.

And the position of the trailing edge is not limited to the embodiments.

Two kinds of position of the trailing edge are determined in the steps S9 through S11 of FIG. 6. However, the position of the trailing edge can be determined more finely according to an amount of data.

In the step S15 of FIG. 7, the recording frequency of the PPM signal is determined based on a film feeding speed. However, it is acceptable that the recording frequency of the PPM signal is determined based on both the amount of data obtained in the step S8 and the film feeding speed.

An example was shown that the power supply circuit 11, the thermal shutdown circuit 13 and the magnetic recording head drive circuit 12 are all included into one chip as the magnetic recording head driver IC. However, it is acceptable that all these circuits are fabricated from discrete parts.

An information magnetic recording apparatus for a camera in which the magnetic recording method is the PPM recording method was explained. However, the magnetic recording method is not limited to the PPM recording method, and other recording method such as the NRZ (Non Return to Zero) recording method is acceptable.

In the above-mentioned first embodiment through third embodiment, the case that the information magnetic recording apparatus according to the present invention applied to a camera was explained. However, the unit is not limited to the camera, and other units that handle a film capable of magnetically recording can be applied to, such as a developing apparatus, a film viewing apparatus or the like.

We claim:

1. An information magnetic recording apparatus, comprising:

a feeding device that winds and rewinds a film;

a magnetic recording head that magnetically records on said film when said feeding device winds said film;

a magnetic recording signal conversion device that converts information of a frame of said film to a magnetic recording signal and outputs the magnetic recording signal;

a head driving circuit that drives said magnetic recording head based on said magnetic recording signal that is outputted from said magnetic recording signal conversion device; and a temperature detection circuit that detects a temperature around said head driving circuit and outputs an abnormal temperature signal if the temperature is abnormal, wherein said magnetic recording signal conversion device stops outputting said magnetic recording signal to cause said head driving circuit not to be driven if said temperature detection circuit outputs said abnormal temperature signal, and then waits until outputting of said abnormal temperature signal is stopped;

said feeding device automatically rewinds said film if said temperature detection circuit outputs said abnormal temperature signal while said magnetic recording head is magnetically recording in synchronization with winding of said film, then waits until outputting of said abnormal temperature signal is stopped and then automatically starts winding said film if outputting of said abnormal temperature signal is stopped after said abnormal temperature signal was outputted;

said magnetic recording signal conversion device restarts outputting said magnetic recording signal if outputting of said abnormal temperature signal from said temperature detection circuit is stopped after said abnormal temperature signal was outputted.

2. An information magnetic recording apparatus according to claim 1, wherein said magnetic recording signal is a signal of a PPM (Pulse Position Modulation) recording method.

3. An information magnetic recording apparatus according to claim 1, further comprising:

a control circuit connected that stops said head driving circuit from driving said magnetic recording head if said temperature detection circuit outputs said abnormal temperature signal.

4. An information magnetic recording apparatus according to claim 3, further comprising:

a power supply circuit that supplies an electric power to said head driving circuit, wherein said control circuit stops supplying the electric power to said head driving circuit and stops driving said magnetic recording head.

5. An information magnetic recording apparatus according to claim 4, wherein said control circuit has a plurality of paths through which said power supply circuit is controlled to stop supplying said electric power to said head driving circuit.

6. An information magnetic recording apparatus according to claim 1, wherein said temperature detection circuit outputs said abnormal temperature signal if said temperature around said head driving circuit is higher than a first value of temperature, and stops outputting said abnormal temperature signal when said temperature around said head driving circuit becomes lower than a second value of temperature, which is lower than said first value of temperature, after said temperature around said head driving circuit became higher than said first value of temperature.

7. An information magnetic recording apparatus according to claim 1, further comprising:

a control device that determines based upon a photographer's instructions whether said feeding device winds said film without magnetically recording, if said temperature detection circuit continues to output said abnormal temperature signal while said magnetic recording head is being driven by said head driving circuit based on said magnetic recording signal even after said magnetic recording signal conversion device restarts outputting said magnetic recording signal at a predetermined number of times.

* * * * *